(12) United States Patent
Kinoshita (10) Patent No.: US 10,285,032 B2
(45) Date of Patent: May 7, 2019

(54) COMMUNICATION APPARATUS AND CONTROL METHOD THEREOF

(71) Applicant: CANON KABUSHIKI KAISHA, Tokyo (JP)

(72) Inventor: Yuichi Kinoshita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/632,822

(22) Filed: Jun. 26, 2017

(65) Prior Publication Data

US 2018/0007500 A1 Jan. 4, 2018

(30) Foreign Application Priority Data

Jun. 30, 2016 (JP) .................................. 2016-131031

(51) Int. Cl.
*H04W 4/80* (2018.01)
*H04W 8/00* (2009.01)
*H04W 28/06* (2009.01)
*H04W 76/10* (2018.01)
*H04W 84/18* (2009.01)

(52) U.S. Cl.
CPC ............. *H04W 4/80* (2018.02); *H04W 8/005* (2013.01); *H04W 76/10* (2018.02); *H04W 28/06* (2013.01); *H04W 84/18* (2013.01)

(58) Field of Classification Search
CPC ..... H04W 28/06; H04W 84/18; H04W 8/005; H04W 4/008; H04W 4/80; H04W 76/02; H04W 76/10
See application file for complete search history.

(56) References Cited

U.S. PATENT DOCUMENTS

| 8,165,633 | B2* | 4/2012 | Chang | G06F 13/102 455/557 |
|---|---|---|---|---|
| 2008/0280655 | A1* | 11/2008 | Ozaki | G01C 21/26 455/569.2 |
| 2009/0023395 | A1* | 1/2009 | Chang | G06F 13/102 455/74.1 |
| 2014/0188398 | A1* | 7/2014 | Cohen | A61B 5/14532 702/19 |
| 2015/0122893 | A1* | 5/2015 | Warther | G06K 7/10366 235/492 |
| 2016/0029149 | A1* | 1/2016 | Morikawa | H04W 76/10 455/41.2 |

(Continued)

FOREIGN PATENT DOCUMENTS

JP 2015-070284 A 4/2015

*Primary Examiner* — Lewis G West
(74) *Attorney, Agent, or Firm* — Venable LLP (57) ABSTRACT

A communication apparatus that performs wireless communication with an external apparatus includes a display control unit to control a display unit so as to display a help screen for providing an explanation of an operation of the external apparatus, and a detection unit to detect a wireless signal transmitted from the external apparatus while no network with the external apparatus is formed. When operation information corresponding to a user operation on the external apparatus is included in a wireless signal detected by the detection unit, the display control unit controls the display unit so as to display the help screen corresponding to the operation information while no network with the external apparatus is formed.

18 Claims, 6 Drawing Sheets

(56) References Cited

U.S. PATENT DOCUMENTS

| | | | |
|---|---|---|---|
| 2016/0029157 A1* | 1/2016 | Egan | H04W 4/80 |
| | | | 455/456.2 |
| 2016/0183653 A1* | 6/2016 | Warther | G06K 19/07726 |
| | | | 340/10.51 |
| 2017/0046107 A1* | 2/2017 | Mihira | G06F 3/0484 |

* cited by examiner

COMMUNICATION APPARATUS AND CONTROL METHOD THEREOF

BACKGROUND OF THE INVENTION

Field of the Invention

The present invention relates to a technique of performing wireless communication.

Description of the Related Art

In recent years, there is a digital camera equipped with Bluetooth® and a Wi-Fi function so that a still image or a moving image recorded by the digital camera can also be used in a mobile phone which is a so-called smartphone. Constant connection to a smartphone by Bluetooth® communication is assumed in such a digital camera, and the digital camera transmits an advertisement signal indicating its presence to its surroundings so that it can be discovered by a connection target smartphone. When the smartphone discovers the digital camera, it performs Bluetooth® communication with the digital camera. When the Bluetooth® communication between the digital camera and the smartphone is completed, low power consumption communication using BLE (Bluetooth® Low Energy) can be performed in the Bluetooth® communication between the digital camera and the smartphone. In BLE, rapid data transfer can be performed by switching to a Wi-Fi connection as needed by an application of the smartphone in a constantly connected state. In addition, encrypted data communication is possible by performing pairing (connection setting) between the digital camera and the smartphone.

In Japanese Patent Laid-Open No. 2015-070284, there is proposed a technique of accepting data from a connection partner device. In this technique, a device (peripheral) requesting a connection partner, in a state in which the BLE connection is not established, includes and transmits self-device identification information and communication data in an advertisement packet, and a connection requested device (central) receives the advertisement packet. In this manner, the BLE has a function, for example, like a broadcaster that periodically includes and transmits temperature data in an advertisement signal to its surrounding devices so as to give notice of the temperature data.

When cooperation between a digital camera and a smartphone is considered, it can be considered that information related to the operations and the functions of the digital camera will be confirmed on the screen of the smartphone. However, in this case, if the desired information is exchanged after the communication between the digital camera and the smartphone is established, it will take time until a user can browse the information.

SUMMARY OF THE INVENTION

The present invention has been made in consideration of the aforementioned problems and allows a user to easily browse related information of an operation made on the side of a communication partner.

In order to solve the aforementioned problems, the present invention provides a communication apparatus that performs wireless communication with an external apparatus, comprising: a display control unit configured to control a display unit so as to display a predetermined screen related to an operation of the external apparatus; and a detection unit configured to detect a wireless signal transmitted from the external apparatus while no network with the external apparatus is formed, wherein when specific information is included in a wireless signal detected by the detection unit, the display control unit controls the display unit so as to display a help screen corresponding to the specific information while no network with the external apparatus is formed.

In order to solve the aforementioned problems, the present invention provides a communication apparatus that performs wireless communication with an external apparatus, comprising: a display control unit configured to display a predetermined screen related to an operation of the external apparatus; and a detection unit configured to detect a wireless signal transmitted from the external apparatus while no network with the external apparatus is formed, wherein when specific information is included in a wireless signal detected by the detection unit, the display control unit controls so as to display a predetermined screen corresponding to the specific information while no network with the external apparatus is formed, and the predetermined screen corresponding to the specific information comprises a screen related to an operation not related to communication between the communication apparatus and the external apparatus.

In order to solve the aforementioned problems, the present invention provides a communication apparatus that performs wireless communication with an external apparatus present within a predetermined range, comprising: an operation unit configured to operate the communication apparatus; a transmission unit configured to transmit a wireless signal that notifies the presence of the communication apparatus to the external apparatus while no network with the external apparatus is formed, wherein the wireless signal includes operation information indicating an operation type or an operation state of the external apparatus; an update unit configured to update, when the operation unit is operated, the operation information included in the wireless signal; and a control unit configured to control the transmission unit so as to transmit a wireless signal in which the operation information has been updated by the update unit.

In order to solve the aforementioned problems, the present invention provides a control method of a communication apparatus that performs wireless communication with an external apparatus and controls so as to display a predetermined screen related to an operation of the external apparatus, the method comprising: detecting a wireless signal transmitted from the external apparatus while no network with the external apparatus is formed, and controlling, when specific information is included in the wireless signal detected by the detection unit, so as to display a help screen corresponding to the specific information while no network with the external apparatus is formed.

In order to solve the aforementioned problems, the present invention provides a control method of a communication apparatus that performs wireless communication with an external apparatus and controls so as to display a predetermined screen related to an operation of the external apparatus, the method comprising: detecting a wireless signal transmitted from the external apparatus while no network with the external apparatus is formed, and controlling, when specific information is included in the wireless signal detected by the detection unit, so as to display a predetermined screen corresponding to the specific information while no network with the external apparatus is formed, wherein the predetermined screen corresponding to the specific information comprises a screen related to an operation not related to communication between the communication apparatus and the external apparatus.

In order to solve the aforementioned problems, the present invention also provides a computer-readable storage medium storing a program for causing a computer to function as the display control unit and detection unit of the aforementioned communication apparatus.

According to the present invention, a user can easily browse related information of an operation made on the side of a communication partner.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The present embodiment describes a system in which a digital camera 100 and a smartphone 200, serving as communication apparatuses present within a predetermined range, perform wireless communication in a low power consumption mode by Bluetooth® Low Energy (to be referred to as BLE hereinafter). Note that the communication apparatus of the present embodiment is not limited to the digital camera 100 and may be, for example, a tablet device, a media player, a monitoring camera, a medical device, or the like. Additionally, the communication apparatus of the present embodiment is not limited to a smartphone which is a type of a mobile phone and may be, for example, a portable device such as a wristwatch-type terminal, an eyeglass-type terminal, a digital camera which has a wireless communication function, a tablet device, a personal computer, or the like.

<Configuration of Digital Camera>

The configuration and functions of a digital camera of the present embodiment will be generally described with reference to FIGS. 1A to 1C.

Figure 1A:
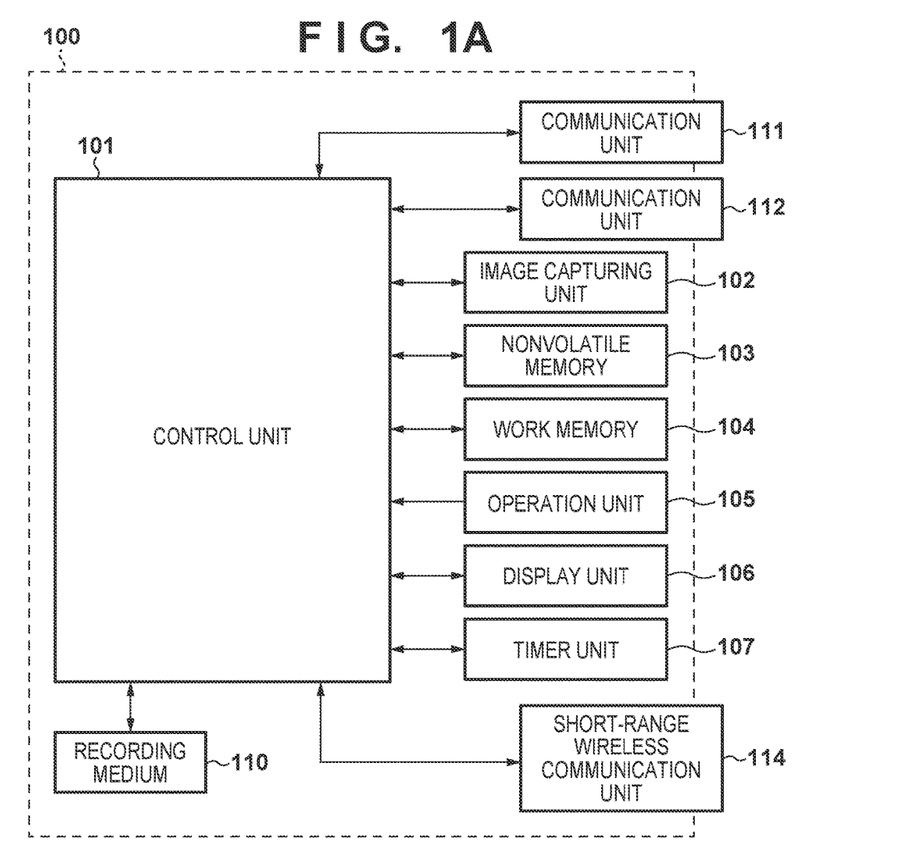
FIG. 1A is a functional block diagram of a digital camera of the present embodiment.
Figure 1B:
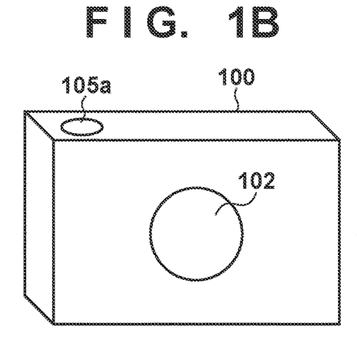
FIGS. 1B and 1C are front view and back view of the digital camera of the present embodiment.

FIG. 1A is a functional block diagram of a digital camera 100. FIGS. 1B and 1C are front view and back view of the digital camera 100.

A control unit 101 is an arithmetic processing unit (CPU) which comprehensively controls the overall digital camera 100, and implements various types of processes in flowcharts (to be described later) by executing programs stored in a nonvolatile memory 103 (to be described later). Note that a plurality of pieces of hardware may control the overall apparatus by sharing processes instead of making the control unit 201 control the overall apparatus.

An image capturing unit 102 includes a lens group including a zoom lens and a focus lens and a shutter having a stop function. The image capturing unit 102 also includes an image sensor formed from a CCD, CMOS device, or the like which converts an object image into an electrical signal, and an A/D converter which converts the analog image signal output from the image sensor into a digital signal.

The image capturing unit 102 has an image processing circuit, and performs image quality adjustment processing of adjusting white balance, color, brightness, and the like with respect to captured image data, and also performs, for example, resize processing to a display size. The image capturing unit 102 also generates an image file by compressing and coding the image data having undergone image quality adjustment processing by JPEG or the like, and records the file in a recording medium 110. In the present embodiment, the image data is recorded in the recording medium 110 so as to conform to DCF (Design Rule for Camera File System) standard. The image capturing unit 102 also performs predetermined arithmetic processing by using captured image data. The control unit 101 then controls the focus lens, stop, and shutter of the image capturing unit 102 based on the obtained arithmetic result, thereby performing AF (Automatic Focus) processing and AE (Automatic Exposure) processing.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing various types of flowcharts to be described later in this embodiment.

A work memory 104 is used as a work area where constants and variables for the operation of the control unit 101, programs read out from the nonvolatile memory 103, and the like are loaded. The work memory 104 is also used as a buffer memory for temporarily holding the image data captured by the image capturing unit 102 or an image display memory for a display unit 106.

An operation unit 105 is constituted by operation members such as various types of switches and buttons and a touch panel which receive various types of operations from the user. The operation unit 105 includes, for example, a shutter button 105a for performing image shooting, a reproduction button 105b for performing a reproduction of shot images, and four-directional keys 105c having up, down, left and right buttons for performing various settings of the camera, as shown in FIGS. 1B and 1C. A touch panel 105d integrally formed with a display unit 106 (to be described later) is also included in the operation unit 105. The operation unit 105 also includes an operation member such as a dedicated connection button for starting a communication with an external apparatus via communication units 111, 112 (to be described later).

The shutter button 105a is turned on to generate a first shutter switch signal SW1 when the shutter button 106b is operated halfway, that is, half-pressed (shooting preparation instruction). Upon receiving the first shutter switch signal SW1, the control unit 101 controls the image capturing unit 102 to start an operation such as AF (Automatic Focus)

processing, AE (Automatic Exposure) processing, AWB (Automatic White Balance) processing, or EF (Electronic Flash) processing. In addition, the shutter button 105a is turned on to generate a second shutter switch signal SW2 when the shutter button 105a is operated completely, that is, full-pressed (shooting instruction). Upon receiving the second shutter switch signal SW2, the control unit 101 starts a series of shooting operations from reading out a signal from the image capturing unit 102 to writing image data in the recording medium 110.

The display unit 106 displays a viewfinder image at the time of shooting, a captured image, and characters for a dialogical operation. The display unit 106 is, for example, a display device such as a liquid crystal display or organic EL display. The display unit 106 may be integrally formed with the digital camera 100 or an external apparatus connected to the digital camera 100.

A timer unit 107 counts time in accordance with time set via the operation unit 105 by the user, time information acquired from the outside via the communication units 111 and 112, or time information acquired by a radio-controlled clock.

The image capturing unit 102 records a coded image file in the recording medium 110. The control unit 101 reads out an already recorded image file from the recording medium 110. The recording medium 110 may be a memory card, hard disk drive, or the like mounted in the digital camera 100, or a flash memory or hard disk drive built in the digital camera 100.

The communication unit 111 is an interface for connection to an external apparatus such as the smartphone 200. The digital camera 100 according to the present embodiment can exchange data with an external apparatus via the communication unit 111. For example, image data generated in the image capturing unit 102 can be transmitted to an external apparatus via the communication unit 111. Note that in the present embodiment, the communication unit 111 includes an interface for performing communication with an external apparatus via a so-called wireless LAN complying with the IEEE 802.11 standard. The control unit 101 implements wireless communication with an external apparatus by controlling the communication unit 111. Note that the communication method is not limited to a wireless LAN and may include, for example, an infrared communication method.

The communication unit 112 is an interface for connection to an external apparatus such as the smartphone 200. The digital camera 100 according to the present embodiment can exchange data with an external apparatus via the communication unit 112. For example, image data generated in the image capturing unit 102 can be transmitted to an external apparatus via the communication unit 112. Note that in the present embodiment, the communication unit 112 includes an interface for communicating with an external apparatus via so-called Bluetooth® complying with the IEEE 802.15.1 standard. The control unit 101 implements wireless communication with an external apparatus by controlling the communication unit 112. Note that the communication method is not limited to Bluetooth® and may include, for example, a wireless LAN known from the IEEE 802.11 standard or an infrared communication method.

Note that the communication unit 112 of the digital camera 100 in the present embodiment has either a peripheral mode or a central mode. The digital camera 100 according to the present embodiment can operate as a Bluetooth® peripheral device by causing the communication unit 112 to operate in the peripheral mode. If the digital camera 100 is to operate as the peripheral device, communication is possible by connecting the digital camera 100 to an external apparatus which is set to operate in the central mode. Note that for the authentication of the external apparatus serving as a connection partner, the unique information of the external apparatus serving as the connection partner is held in the nonvolatile memory 103 by performing pairing (connection setting) in advance. Also, if power is supplied to a Bluetooth® interface module even when the power supply switch is OFF, the digital camera 100 can transmit an advertisement packet (to be referred to as an advertisement signal hereinafter).

A short-range wireless communication unit 114 is formed from, for example, an antenna for wireless communication, a modulation/demodulation circuit for processing a wireless signal, and a communication controller. The short-range wireless communication unit 114 outputs a modulated wireless signal from the antenna and demodulates a wireless signal received from the antenna to implement non-contact near field communication complying with the ISO/IEC18092 standard (so-called NFC: Near Field Communication). The short-range wireless communication unit 114 of the present embodiment is arranged on the side surface of the main body unit of the digital camera 100.

The digital camera 100 starts communication with and is connected to the smartphone 200 (to be described later) by bringing the short-range wireless communication unit 114 and a short-range wireless communication unit 214 close to each other. Note that when the short-range wireless communication unit 114 is used to connect the digital camera 100 to the smartphone 200, it is not always necessary to bring the short-range wireless communication unit 114 and the short-range wireless communication unit 214 into contact with each other. Since the short-range wireless communication unit 114 and the short-range wireless communication unit 214 can communicate with each other if they are only a predetermined distance apart, the units need only be brought close to a range in which short-range wireless communication is possible in order to connect their respective devices.

Figure 1C:
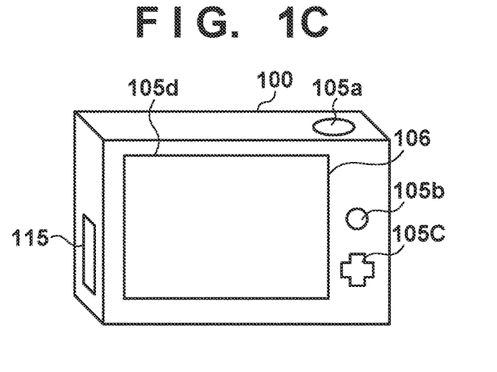

The digital camera 100 of the present embodiment also includes a power supply antenna unit 115 on the side surface of the camera main body as shown in FIG. 1C. Power supply can be performed by bringing this antenna unit 115 within a predetermined distance of a power supply device. As a result, non-contact power supply is possible without using a cable or the like, and the start and the end of the power supply can be controlled.

<Configuration of Smartphone>

Figure 2:
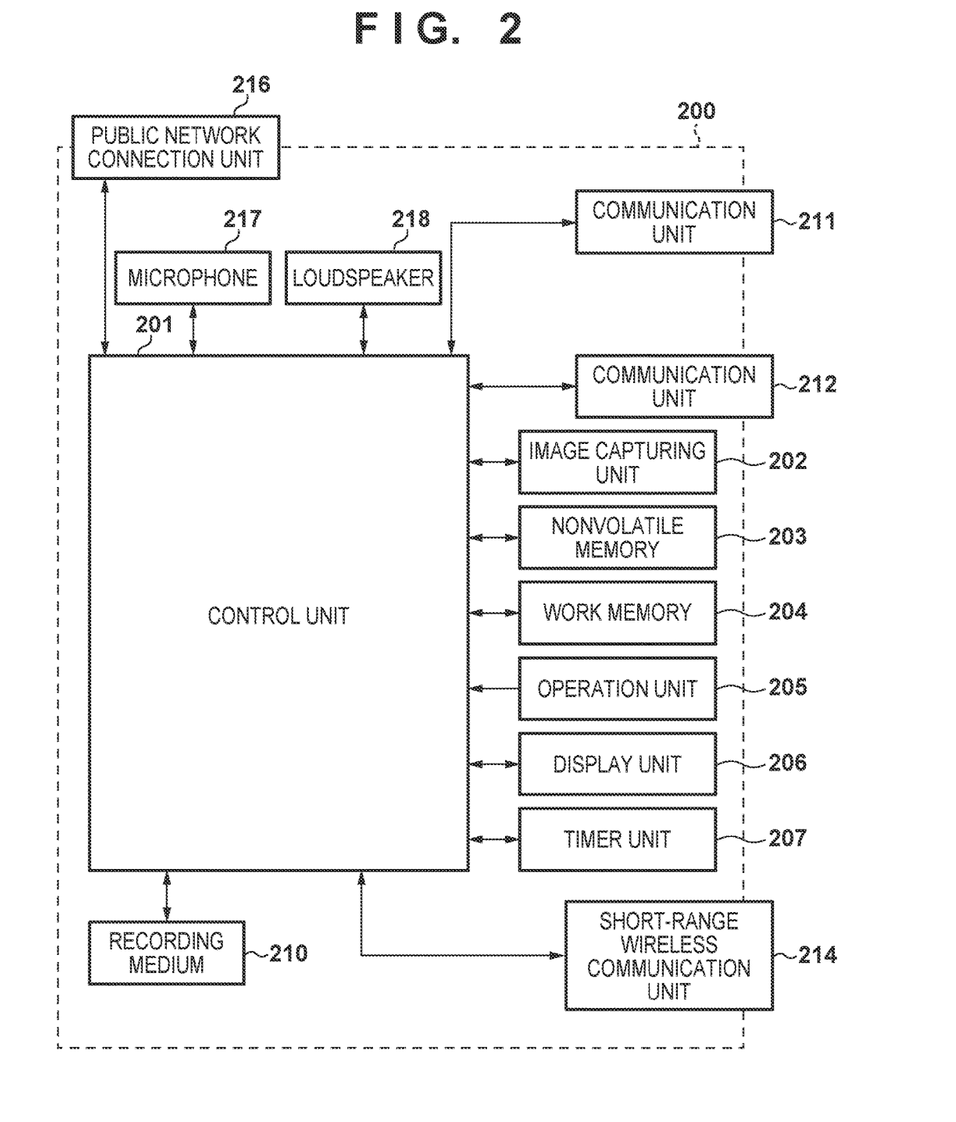
FIG. 2 is a functional block diagram of a smartphone of the present embodiment.

Next, the configuration and functions of the smartphone 200 will be generally described with reference to FIG. 2.

The smartphone 200 according to this embodiment includes a control unit 201, an image capturing unit 202, a nonvolatile memory 203, a work memory 204, an operation unit 205, a display unit 206, a timer unit 207, a recording medium 210, communication units 211, 212 and the short-range wireless communication unit 214. The basic functions of the respective elements are the same as those of the digital camera 100, and hence a detailed description of them will be omitted.

The nonvolatile memory 203 stores an OS (operating system) which is the basic software executed by the control unit 201 and an application which implements an applicable function in cooperation with this OS. Communication processing of the smartphone 200 according to the present embodiment is implemented by reading software provided by the application. Note that the application has software for using the basic functions of the OS installed in the smartphone 200. Note that the OS of the smartphone 200 can have software to implement processes according to the present embodiment.

The timer unit 207 counts time based on time information set by the user, time information acquired via the communication unit 211, the communication unit 212, or a public network connection unit 216, or time information acquired by a radio-controlled clock. The timer unit 207 may also be capable of acquiring, via a detection mechanism, time information from a mechanism such as an analog clock (in this case, the detection mechanism from the analog clock is included in the timer unit 207).

The public network connection unit 216 is an interface used for wireless communication via Wide Area Network (WAN) such as 3G or LTE. The smartphone 200 can perform a telephone call and data communication with another device via the public network connection unit 216. When performing the telephone call, the control unit 201 inputs and outputs voice signals via a microphone 217 and a loudspeaker 218. Assume that in this embodiment, the public network connection unit 216 is not limited to 3G or LTE and it is possible to use another communication scheme such as WiMAX, ADSL or FTTH. In addition, the communication units 211, 212 and the public network connection unit 216 need not be implemented by independent pieces of hardware. For example, one antenna can have both functions.

<Pairing by BLE>

Pairing in a case in which the digital camera 100 and the smartphone 200 perform communication in a low power consumption mode by BLE will be described next with reference to FIGS. 3A to 3C.

When a pairing mode for performing BLE connection is set in the digital camera 100 by the operation of a user 301, the digital camera 100 transmits an advertisement signal 302 to its surroundings.

When the pairing mode for performing BLE connection is set by the operation of the user 301, the smartphone 200 searches for the advertisement signal 302 transmitted from the communication unit 112 of the digital camera 100. In addition, when the advertisement signal 302 is received via the communication unit 212, the smartphone 200 displays, on the display unit 206, the identification information of the camera based on the pairing information included in the advertisement signal 302 and gives notice of the detection of the digital camera 100 to the user. When the user 301 sees the notification displayed on the display unit 206 and instructs pairing with the detected digital camera 100, the smartphone 200 transmits a connection request to the digital camera 100 and establishes a connection with the digital camera 100.

When the connection with the digital camera 100 is established, the smartphone 200 transmits a pairing request to the digital camera 100, exchanges key information for communication data encryption, and changes to a state in which encrypted communication can be performed between the smartphone 200 and the digital camera 100. Subsequently, the smartphone 200 transmits the identification information of an application activated in the smartphone 200 to the digital camera 100, the digital camera 100 stores the identification information received from the smartphone 200, and the pairing is completed. Note that if data communication is to be performed without exchanging key information, that is, without encryption between the digital camera 100 and the smartphone 200, it can be arranged so that the identification information of the digital camera 100 serving as a pairing partner is stored by the application operating in the smartphone 200 and only the identification information of the application is stored in the digital camera 100.

When the pairing of the digital camera 100 and the smartphone 200 is completed by the aforementioned procedure, the digital camera 100 transmits the advertisement signal, and when the smartphone 200 detects the digital camera 100 that has undergone the pairing operation, the smartphone 200 can determine that the pairing has been completed.

<System Configuration>

An operation by the system of the present embodiment will be described next with reference to FIGS. 3A to 3C.

Figure 3A:
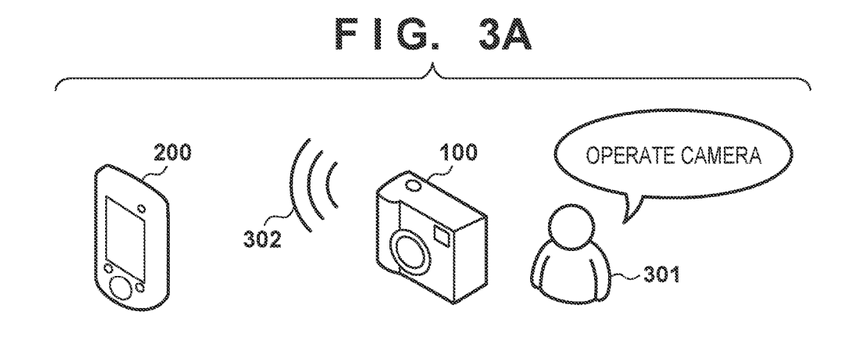
FIGS. 3A to 3C are diagrams showing a system configuration of the present embodiment.
Figure 3B:
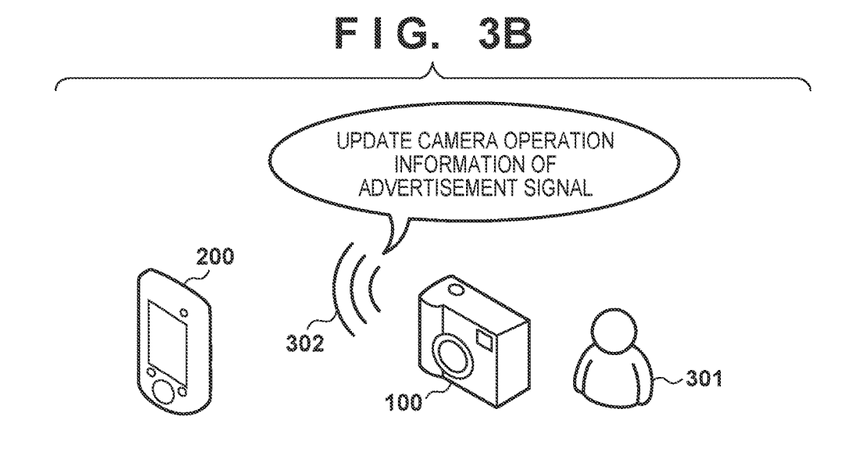
Figure 3C:
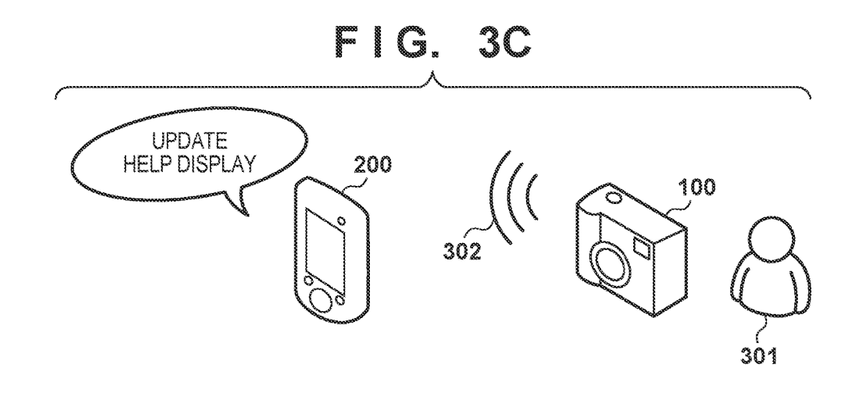

FIGS. 3A to 3C are views for explaining processing of detecting the advertisement signal 302 transmitted from the digital camera 100 and updating a help display of the smartphone 200. Note that in the following description, it is assumed that the smartphone 200 has connected with the digital camera 100 by BLE and has exchanged the pairing information.

In FIG. 3A, the user 301 enables a BLE function by operating the digital camera 100 equipped with a battery and starts operating the digital camera 100. The digital camera 100 generates camera operation information 501 (to be described later with reference to FIG. 5) in response to the operation of the digital camera 100, adds this camera operation information 501 to the advertisement signal 302, and transmits the advertisement signal.

In FIG. 3B, the smartphone 200 detects the advertisement signal 302 transmitted from the digital camera 100 and analyzes the camera operation information 501 included in the advertisement signal 302 (to be described later with reference to FIG. 5).

In FIG. 3C, the smartphone 200 determines whether an operation has been performed to the digital camera 100 based on the analysis result of the camera operation information 501. If an operation has been performed, the information is collated with display data stored in the nonvolatile memory 203 and the display data corresponding to the camera operation is displayed on the display unit 206.

As described above, when the smartphone 200 receives the advertisement signal of the digital camera 100, the data displayed on the display unit 206 of the smartphone 200 is updated in accordance with the operation of the digital camera 100. Hence, the user of the smartphone 200 can confirm the information related to the operation of the digital camera 100 without performing BLE connection with the digital camera 100.

<Application Screen>

An application screen that is displayed on the display unit 206 of the smartphone 200 when the advertisement signal of the digital camera 100 is detected will be described next with reference to FIG. 4.

The smartphone 200 analyzes the advertisement signal received from the digital camera 100. When the camera operation information 501, as that shown in FIG. 5, is detected from the advertisement signal, the smartphone 200 displays a screen 401, as shown in FIG. 4, inquiring the user whether to display the information of the digital camera 100. If the user who has seen the screen 401 touches an OK button 402, the smartphone 200 collates the camera operation information 501 detected from the advertisement signal with the display data stored in the nonvolatile memory 103 and displays a help display corresponding to the camera operation information 501.

<Data Configuration of Advertisement Signal>

A data configuration of the advertisement signal used for communication in the low power consumption mode by BLE of the present embodiment will be described next with reference to FIG. 5.

A device name, an ID unique to the device, and a service ID are included in the advertisement signal transmitted by the digital camera 100. The advertisement signal also has a manufacture data area 500 in which specific information can be arbitrarily added, and the camera operation information 501 is written as specific information in this manufacture data area 500. A camera type 502, a camera operation 503, a camera state 504, and a pairing history 505 are added to the camera operation information 501. The camera type 502 is, for example, information corresponding to the device type of the digital camera 100. The camera operation 503 is, for example, information corresponding to the type of operation made when the user operates the digital camera 100. The camera state 504 is information corresponding to the current setting information of the digital camera 100. The pairing history 505 is, for example, information related to the application of the smartphone 200 that has been exchanged when pairing was performed with the smartphone 200 in the past.

The digital camera 100 adds the aforementioned camera operation information 501 as a piece of data to the manufacture data area 500 of the advertisement signal and transmits the advertisement signal. The smartphone 200 reads the camera type 502 from the camera operation information 501 included in the advertisement signal and determines whether the digital camera 100 is a device type that supports the smartphone 200. The smartphone 200 also displays, as the help display, the related information of the operation of the digital camera 100 corresponding to the device type of the digital camera 100.

<Display According to Camera Operation>

In the display of the related information of the operation of the digital camera 100 according to the present embodiment, the smartphone 200 displays the contents related to the operation of the digital camera 100 on the display unit 206 and updates the display contents in accordance with the operation of the camera. For example, if the user is to select a focus position of the digital camera 100, the digital camera 100 generates the camera operation information 501 and transmits the advertisement signal upon receiving the camera operation performed by the user. Note that camera operations performed by the user include, for example, overall operations related to the camera that are executable while the power supply of the digital camera 100 is ON, such as a white balance setting, an exposure correction setting, a selection setting of recording image quality, an AE lock operation related to a shooting operation, a focus lock operation, a release operation, and the like.

After the user has operated the digital camera 100, the smartphone 200 reads the camera operation information 501 from the advertisement signal 302 upon detecting the advertisement signal transmitted by the digital camera 100. The smartphone 200 then collates the information corresponding to the camera operation 503 included in the camera operation information 501 with the display data stored in the nonvolatile memory 203. Subsequently, the display data that matches the camera operation information 501 is displayed on the display unit 206 of the smartphone 200 as the related information of the operation of the digital camera 100. Note that the display data is included in an application of the smartphone 200 and is stored in advance in the nonvolatile memory 203 of the smartphone 200. Note that if the smartphone 200 does not have the display data, the smartphone 200 can acquire the display data from an external server via the Internet.

The contents displayed on the display unit 206 of the smartphone 200 correspond to the camera operations performed by the user. For example, the descriptions about the selection operation of a focus position and the setting operation for white balance according to the device type of the digital camera 100 can be displayed. In addition, if it is detected, from the camera operation 503 of the camera operation information 501, that the user has operated the shutter button, a description about how to hold the camera can be displayed. Other descriptions that are detected from the camera state 504 of the camera operation information 501, such as a description about the ON/OFF state of the power supply of the digital camera 100, the orientation state (the state of how the user has held the camera vertically or horizontally) of the digital camera 100, the shooting position recorded together with the image, and the like are also included. Note that if it is detected from the camera state 504 of the camera operation information 501 that the power supply of the digital camera 100 is OFF, the display data corresponding to the camera operation 503 may not be displayed, and a display prompting the user to turn on the power supply of the camera may be displayed.

<Display Processing Based on Pairing History>

The smartphone 200 of the present embodiment may receive advertisement signals from a plurality of digital cameras 100 and detect a plurality of pieces of camera operation information 501. On the other hand, the smartphone 200 can determine, based on the pairing history 505 of the camera operation information 501, whether a digital camera is the digital camera 100 with which it has performed pairing in the past and has exchanged the pairing information. Hence, in a case in which the plurality of digital cameras 100 are detected, the smartphone 200 may prioritize displaying each digital camera 100 that has undergone a pairing operation than each digital camera 100 that has not undergone a pairing operation. If only digital cameras 100 that have not undergone a pairing operation are detected, a display prompting the user to perform pairing with the smartphone 200 can be performed. Furthermore, a priority degree can be set in accordance with the camera type for the plurality of digital cameras 100, and the cameras may be displayed sequentially from those having the highest priority or the plurality of cameras can be displayed in a user selectable list and the display of each selected camera can be prioritized.

Note that when the unique information of a digital camera that has not undergone a pairing operation is to be displayed on the smartphone 200, a restriction can be set so no item related to personal information of the digital camera 100 will be displayed.

<BLE Communication by Digital Camera 100>

Processing in which the digital camera 100 generates and transmits the advertisement signal in accordance with the camera operation in the BLE communication of the present embodiment will be described next with reference to FIG. 6.

Figure 6:
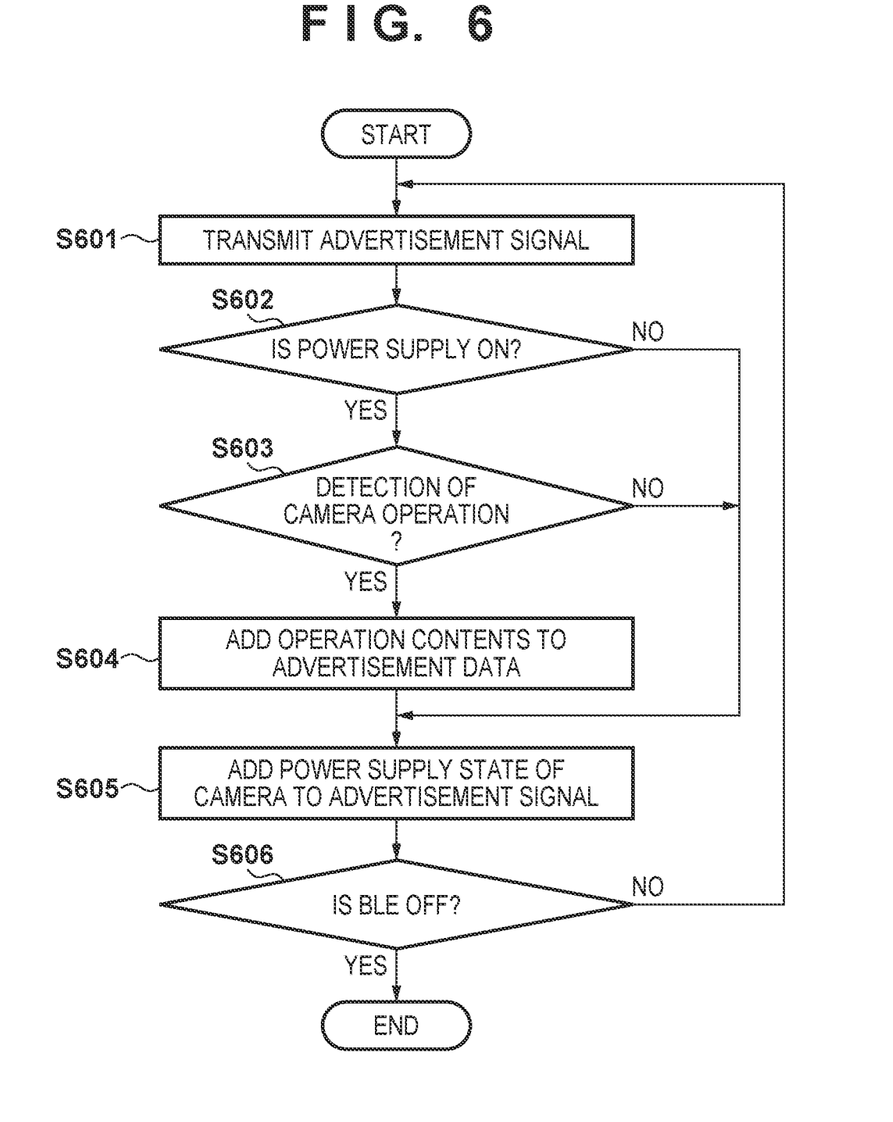
FIG. 6 is a flowchart showing advertisement data generation and advertisement signal transmission processing by the digital camera of the present embodiment.

Note that the processing of FIG. 6 is implemented by the control unit 101 of the digital camera 100 loading a control program read out from the nonvolatile memory 103 to the work memory 104 and executing the program. Note that the processing of FIG. 6 is started from a state in which the BLE function of the digital camera 100 is turned on and the digital camera 100 can transmit the advertisement signal to its surroundings.

In step S601, the control unit 101 transmits the advertisement signal.

In step S602, the control unit 101 determines whether a power supply switch included in the operation unit 105 is ON. If the switch is ON, the process advances to step S603. Otherwise, the process advances to step S605. The control unit 101 also stores the determination result of the power supply state in the nonvolatile memory 103.

In step S603, the control unit 101 determines whether a camera operation, such as the operation of the operation unit 105, by the user has been detected. If a camera operation has been detected, the process advances to step S604. Otherwise, the process advances to step S605.

Figure 5:
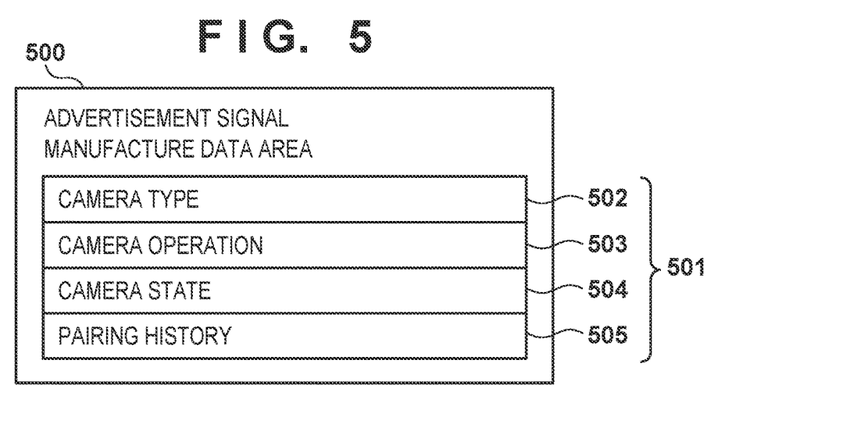
FIG. 5 is a view of the data structure of an advertisement signal of the present embodiment.

In step S604, the control unit 101 writes the operation type and the setting information of the camera that were detected in step S603 in the camera operation 503 and the camera state 504 of the camera operation information 501 shown in FIG. 5.

In step S605, the control unit 101 writes the power supply state of the camera which was determined in step S602 and stored in the nonvolatile memory 103 in the camera state 504 of the camera operation information 501 shown in FIG. 5.

In step S606, the control unit 101 determines whether the BLE function of the digital camera 100 has been turned off. If the BLE function has been turned off, the process ends. Otherwise, the process returns to step S601, and the above described processes are repeated.

<Display Update Processing of Smartphone 200>

Processing in which the smartphone 200 updates the help display in accordance with the operation of the digital camera 100 in the BLE communication of the present embodiment will be described next with reference to FIG. 7.

Figure 7:
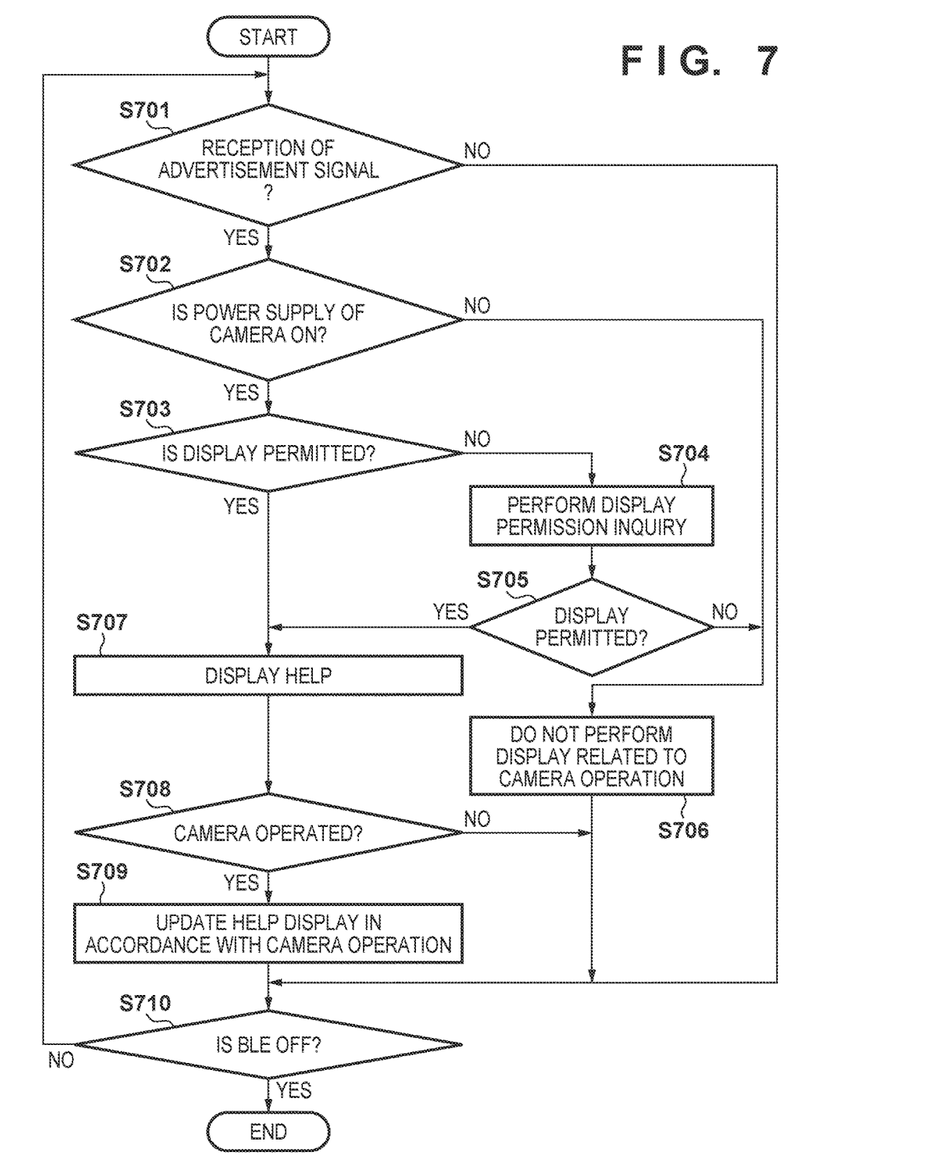
FIG. 7 is a flowchart showing display processing corresponding to the operation of the digital camera by the smartphone of the present embodiment.

Note that the processing of FIG. 7 is implemented by the control unit 201 of the smartphone 200 loading a control program read out from the nonvolatile memory 203 to the work memory 204 and executing the program. In addition, the processing of FIG. 7 is started from a state in which the BLE function of the smartphone 200 is turned on and the advertisement signal transmitted from the digital camera 100 can be detected.

In step S701, the control unit 201 determines whether an advertisement signal has been received from the digital camera 100 via the communication unit 212. If the advertisement signal has been received, the process advances to step S702. Otherwise, the process advances to step S708.

In step S702, the control unit 201 reads the camera operation information 501 included in the advertisement signal received in step S701 and determines from the camera state 504 whether the power supply state of the camera is ON. If the power supply state is ON, the process advances to step S703. Otherwise, the process advances to step S704.

Figure 4:
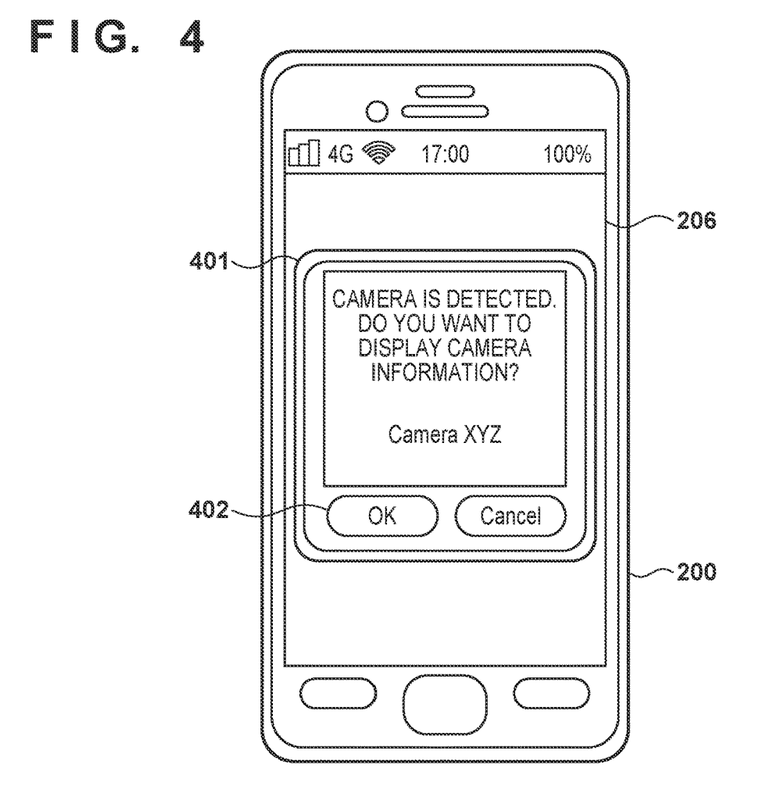
FIG. 4 is a view exemplifying an application screen of a smartphone of the present embodiment.

In step S703, the control unit 201 determines whether the smartphone 200 has been permitted to display the related information of the operation of the digital camera 100 by performing user inquiry by the screen shown in FIG. 4. If the display has been permitted, the process advances to step S705. Otherwise, the process advances to step S704.

In step S704, the control unit 201 inquires the user of the digital camera 100 whether the related information of the operation of the digital camera 100 can be displayed in the smartphone 200. As described in FIG. 4, this inquiry is performed by displaying a dialogue or the like in which the user can select whether the help display of the display unit 206 can be permitted.

At this time, a checkbox with a message such as "do not inquire about the display again" can be provided so that the user can set the ON/OFF function of inquiry redisplay and prevent the inquiry dialogue from being displayed each time an advertisement signal is detected. Note that it can be arranged so that the aforementioned ON/OFF function of the inquiry redisplay is switched in accordance with the setting.

In step S705, the control unit 201 determines whether the user of the smartphone 200 has permitted the display of the related information of the operation of the digital camera 100 on the smartphone 200. If the user has permitted the display, the process advances to step S707. Otherwise, the process advances to step S706.

In step S706, the control unit 201 sets not to display the related information of the operation of the digital camera 100 on the smartphone 200, and the process advances to step S708. Note that if the related information of the operation of the digital camera is already displayed on the smartphone 200, control is performed to delete the display.

In step S707, the control unit 201 collates the display data stored in the nonvolatile memory 203 with the camera operation information 501 and displays the help display corresponding to the camera operation on the display unit 206.

In step S708, the control unit 201 determines, based on the camera operation information 501, whether the digital camera 100 has been operated. Here, the control unit 201 collates the information of the camera operation 503 included in the camera operation information 501 with the display data stored in the nonvolatile memory 203 and determines whether there is information in the camera operation 503 to update the display data. If a camera operation is detected, the process advances to step S709. Otherwise, the process advances to step S710.

In step S709, the control unit 201 updates the help display displayed on the display unit 206 in accordance with the camera operation detected in step S708.

In step S710, the control unit 201 determines whether the BLE function of the smartphone 200 is OFF. If the BLE function is OFF, the detection of the advertisement signal is ended. Otherwise, the process returns to step S701, and the aforementioned processes are repeated.

According to the above-described procedure, the smartphone 200 can update the help display of the display unit 206 in accordance with the operation of the digital camera 100 without performing BLE connection with the digital camera 100. Therefore, it becomes possible for the user to easily browse the related information of the operation of the digital camera 100.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131031, filed Jun. 30, 2016 which is hereby incorporated by reference herein in its entirety.

What is claimed is:

1. A communication apparatus that performs wireless communication with an external apparatus, comprising:
a display control unit configured to control a display unit so as to display a help screen for providing an explanation of an operation of the external apparatus; and
a detection unit configured to detect a wireless signal transmitted from the external apparatus while no network with the external apparatus is formed,
wherein when operation information corresponding to a user operation on the external apparatus is included in a wireless signal detected by the detection unit, the display control unit controls the display unit so as to display the help screen corresponding to the operation information while no network with the external apparatus is formed.

2. The apparatus according to claim 1, wherein the display control unit controls the display unit so as to update the help screen in accordance with contents of the operation information included in the wireless signal detected by the detection unit.

3. The apparatus according to claim 2, wherein the operation information includes information of an operation type or an operation state in the external apparatus, and
the display control unit controls the display unit so as to update the help screen in accordance with the information of the operation type or the operation state in the external apparatus.

4. The apparatus according to claim 1, wherein the operation information included in the wireless signal includes information related to connection setting with an external apparatus that has been connected, and
if a plurality of external apparatuses are present based on the wireless signal detected by the detection unit, the display control unit controls the display unit so as to display information of the plurality of external apparatuses based on the information related to the connection setting.

5. The apparatus according to claim 1, further comprising:
a determination unit configured to determine from the operation information whether power supply of the external apparatus has been turned on,
wherein if the determination unit determines that the power supply of the external apparatus has not been turned on, the display control unit controls not to display the help screen corresponding to the specific information.

6. The apparatus according to claim 1, further comprising:
an acquisition unit configured to acquire, if the help screen corresponding to the operation information has not been saved, information of the help screen from another apparatus,
wherein the display control unit controls, based on the information acquired by the acquisition unit, the display unit so as to display the help screen corresponding to the operation information.

7. The apparatus according to claim 1, wherein the wireless communication is communication based on Bluetooth, the detection unit detects an advertisement signal as the wireless signal, and the display control unit controls the display unit so as to update the help screen in accordance with operation information included in the advertisement signal detected by the detection unit.

8. The apparatus according to claim 1, wherein the communication apparatus comprises a smartphone.

9. A communication apparatus that performs wireless communication with an external apparatus, comprising:
a display control unit configured to display a help screen for providing an explanation of an operation of the external apparatus; and
a detection unit configured to detect a wireless signal transmitted from the external apparatus while no network with the external apparatus is formed,
wherein when operation information corresponding to a user operation on the external apparatus is included in a wireless signal detected by the detection unit, the display control unit controls so as to display a predetermined screen corresponding to the corresponding information while no network with the external apparatus is formed, and
the predetermined screen corresponding to the operation information comprises a screen related to an operation not related to communication between the communication apparatus and the external apparatus.

10. The apparatus according to claim 9, wherein the display control unit controls so as to update the predetermined screen in accordance with contents of the operation information included in the wireless signal detected by the detection unit.

11. The apparatus according to claim 10, wherein the operation information includes information of an operation type or an operation state in the external apparatus, and
the display control unit controls so as to update the predetermined screen in accordance with the information of the operation type or the operation state in the external apparatus.

12. The apparatus according to claim 9, wherein the specific information included in the wireless signal includes information related to connection setting with an external apparatus that has been connected, and
if a plurality of external apparatuses are present based on the wireless signal detected by the detection unit, the display control unit controls so as to display information of the plurality of external apparatuses based on the information related to the connection setting.

13. The apparatus according to claim 9, further comprising:
a determination unit configured to determine from the operation information whether power supply of the external apparatus has been turned on,
wherein if the determination unit determines that the power supply of the external apparatus has not been turned on, the display control unit controls not to display the predetermined screen corresponding to the specific information.

14. The apparatus according to claim 9, further comprising:
an acquisition unit configured to acquire, if the predetermined screen corresponding to the operation information has not been saved, information of the predetermined screen from another apparatus,
wherein the display control unit controls, based on the information acquired by the acquisition unit, the display unit so as to display the predetermined screen corresponding to the operation information.

15. The apparatus according to claim 9, wherein the wireless communication is communication based on Bluetooth, the detection unit detects an advertisement signal as the wireless signal, and the display control unit controls so as to update the predetermined screen in accordance with operation information included in the advertisement signal detected by the detection unit.

16. A communication apparatus that performs wireless communication with an external apparatus which serves as the communication apparatus defined in claim 1 and is present within a predetermined range, comprising:
an operation unit configured to accept a user operation for operating the communication apparatus;
a transmission unit configured to transmit a wireless signal that notifies the presence of the communication apparatus to the external apparatus while no network with the external apparatus is formed, wherein the wireless signal includes operation information indicating the user operation, wherein the operation information causes the external apparatus to display a help screen for providing an explanation of an operation to perform on the external apparatus in response to the user operation;
an update unit configured to update, when the operation unit is operated, the operation information included in the wireless signal; and
a control unit configured to control the transmission unit so as to transmit a wireless signal in which the operation information has been updated by the update unit.

17. A control method of a communication apparatus that performs wireless communication with an external apparatus and controls so as to display a help screen for providing an explanation of an operation of the external apparatus, the method comprising:
detecting a wireless signal transmitted from the external apparatus while no network with the external apparatus is formed, and
controlling, when operation information corresponding to a user operation on the external apparatus is included in the wireless signal detected by the detection unit, so as to display the help screen corresponding to the operation information while no network with the external apparatus is formed.

18. A computer-readable storage medium storing a program for causing a computer to function as a display control unit and a detection unit of a communication apparatus that performs wireless communication with an external apparatus, wherein:
the display control unit is configured to control a display unit so as to display a help screen for providing an explanation of an operation of the external apparatus; and
the detection unit configured to detect a wireless signal transmitted from the external apparatus while no network with the external apparatus is formed,
when operation information corresponding to a user operation on the external apparatus is included in a wireless signal detected by the detection unit, the display control unit controls the display unit so as to display the help screen corresponding to the operation information while no network with the external apparatus is formed.

* * * * *